US005694528A

United States Patent [19]
Hube

[11] Patent Number: 5,694,528
[45] Date of Patent: Dec. 2, 1997

[54] APPARATUS AND METHOD FOR DIAGNOSING PRINTING MACHINE OPERATION WITH FACSIMILE TRANSMITTED DIALOG SCREENS

[75] Inventor: Randall R. Hube, Rochester, N.Y.

[73] Assignee: Xerox Corporation, Stamford, Conn.

[21] Appl. No.: 561,742

[22] Filed: Nov. 22, 1995

[51] Int. Cl.$^6$ .................. G06K 15/02; H04N 1/23; G03G 21/00; G06F 11/00; G06F 13/00
[52] U.S. Cl. .............. 395/113; 395/114; 395/183.22; 399/8; 399/9; 358/401; 358/406
[58] Field of Search ........................ 395/113, 114, 395/183.22; 399/8, 9, 10, 11, 81; 358/401, 406, 468, 442, 501, 504

[56] References Cited

U.S. PATENT DOCUMENTS

| | | | |
|---|---|---|---|
| 5,077,582 | 12/1991 | Kravette et al. | 399/8 |
| 5,325,156 | 6/1994 | Ulinski | 399/8 |
| 5,365,310 | 11/1994 | Jenkins et al. | 399/8 |
| 5,388,252 | 2/1995 | Dreste et al. | 395/183.22 |

*Primary Examiner*—Scott A. Rogers
*Attorney, Agent, or Firm*—Gary B. Cohen

[57] ABSTRACT

A system, including a printing system and a remote diagnostic facility, is provided for performing a diagnostic operation relative to the printing system by reference to electronic data corresponding with one or more dialog screens stored in a memory of the printing system. In practice, a telecommunication link is formed between a facsimile transmission system of the printing system and a facsimile receiving system of the remote diagnostic facility, and the electronic data corresponding with the one of the one or more dialog screens is specified for transmission thereof across the communication link. When an event occurs, the electronic data corresponding with the one of the one or more dialog screens is transmitted from the facsimile transmission system to the facsimile receiving system, a print is produced, at the remote diagnostic facility, with the transmitted electronic data, and a diagnostic operation is performed with the print.

16 Claims, 12 Drawing Sheets

APPARATUS AND METHOD FOR DIAGNOSING PRINTING MACHINE OPERATION WITH FACSIMILE TRANSMITTED DIALOG SCREENS

The present invention relates generally to a diagnostic system for a printing system and more particularly to an apparatus and method for diagnosing printing machine operation by reference to one or more dialog screens facsimile transmitted from the printing machine to a "hotline", i.e. a diagnostic station including a facsimile receiving facility for reproducing the facsimile transmitted dialog screens.

Recently, systems for monitoring the operation of a plurality of reprographic machines from a remote source by use of a powerful host computer having advanced, high level diagnostic capabilities have been installed. These systems have the capability to interact remotely with the machines being monitored to receive automatically initiated or user initiated requests for diagnosis and to interact with the requesting machine to receive stored data to enable higher level diagnostic analysis. Such systems are shown in U.S. Pat. Nos. 5,038,319 and 5,057,866 (the disclosures of which are incorporated herein by reference), owned by the assignee of the present invention. These systems employ Remote Interactive Communications (RIC) to enable transfer of selected machine operating data (referred to as machine physical data) to the remote site at which the host computer is located, through a suitable communication channel. The machine physical data may be transmitted from a monitored document system to the remote site automatically at predetermined times and/or in response to a specific request from the host computer.

In a typical RIC system, the host computer is linked via a public switched telephone system or a combination of public and dedicated systems to local reprographic machines via modems. The host computer may include a compiler to allow communication with a plurality of different types of machines and an expert diagnostic system that performs higher level analysis of the machine physical data than is available from the diagnostic system in the machine. After analysis, the expert system can provide an instruction message which can be utilized by the machine operator at the site of the document system to overcome a fault. Alternatively, if the expert system determines that more serious repair is necessary or a preventive repair is desirable, a message is sent to a local field work office giving the identity of the machine and a general indication of the type of service action required.

The following reference, the pertinent portions of which are incorporated herein by reference, addresses various concerns raised above by providing improved communication between a faulted machine and a central diagnostic system or local field service facility:

U.S. Pat. No. 5,325,156

Patentee: Ulinski

Issued: Jun. 28, 1994

U.S. Pat. No. 5,325,156 discloses a system in which a user interface at a faulted machine establishes communication with a remote diagnostic or service facility, automatically transmits machine identify and physical data, with or without additional operator supplied information, for accepting and displaying status messages, without the need for oral communication.

While U.S. Pat. No. 5,325,156 is well suited for its intended purpose it does not contemplate a situation where a printing machine operator seeks to reproduce certain image information at a remote diagnostic facility to facilitate oral communication with a customer support representative ("CSR"). In a preferred form of the present invention, reproduction of an image, and, more specifically, reproduction of a dialog screen from a host printing machine, is achieved with facsimile reproduction. It is known that facsimile transmission over a network can be achieved with various conventional arrangements. It is known that a dialog screen can be transmitted to a remote location from a workstation by use of a facsimile arrangement. Moreover, a single telephone link can be used to facilitate facsimile communication simultaneously with a conversation between two parties. It is believed that A.T.&T. Corporation makes available a system in which two parties can speak over a line while facsimile transmission is being executed on the same line.

As the complexity of reprographic machines escalates, the situation in which a machine operator is unable to interpret a particular dialog screen becomes more prevalent. In these situations, it may become difficult for an operator to describe his/her interpretation difficulties to a CSR (Customer Support Representative) over a telephone since the interpretation requires a viewing of the screen by the CSR. Moreover, many problems encountered by machine operators can be solved readily by the CSR simply viewing selected dialog screens of the subject printing machine. Alternatively, a visit by a dispatched CSE (Customer Service Engineer) to perform such simple viewing, however, can be relatively costly in view of the relatively little amount of actual work required of the CSE. It would be desirable to provide a system in which the CSR can be provided with a reproduction of one or more screens to facilitate a telephone conversation with an operator who, for one reason or another, is unable to grasp the full import or meaning of one or more dialog screens.

In accordance with the disclosed invention there is provided a print diagnostic system for performing a diagnostic operation with a print produced from electronic data representative of one or more dialog screens. The print diagnostic system includes: a) a printing system including, (1) a printing machine, (2) memory for storing the electronic data, and (3) a facsimile transmission system; b) a telecommunication link; c) a printing machine diagnostic facility communicating with said printing machine by way of said telecommunication connection, said print machine diagnostic facility including a facsimile receiving system; said facsimile receiving system including a facsimile print engine for reproducing the print from the electronic data, d) a subsystem for specifying one of the one or more dialog screens stored in the printing machine memory for transmission, by way of said telecommunication link, from the printing machine to the printing machine diagnostic facility; f) wherein, (1) the electronic data corresponding with the one of the one or more dialog screens is transmitted from the facsimile transmission system to the facsimile receiving system, and (2) a print, intended for use in diagnosing operation of the printing machine, is produced with the transmitted electronic data at the facsimile print engine.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
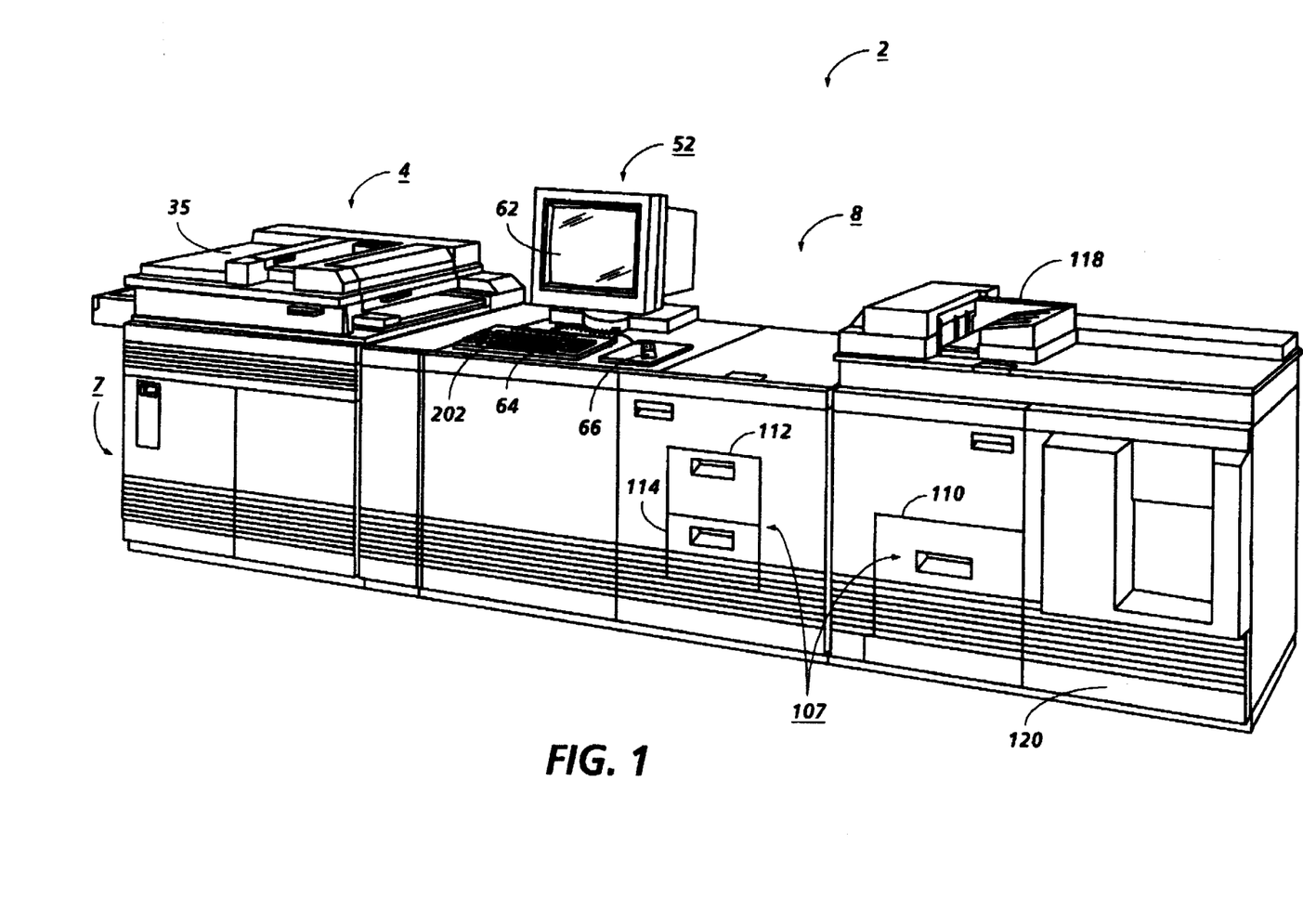
FIG. 1 is a perspective view of an electronic printing machine serving as a host printing machine for use in a diagnostic system embodying the present inventive technique.
Figure 2:
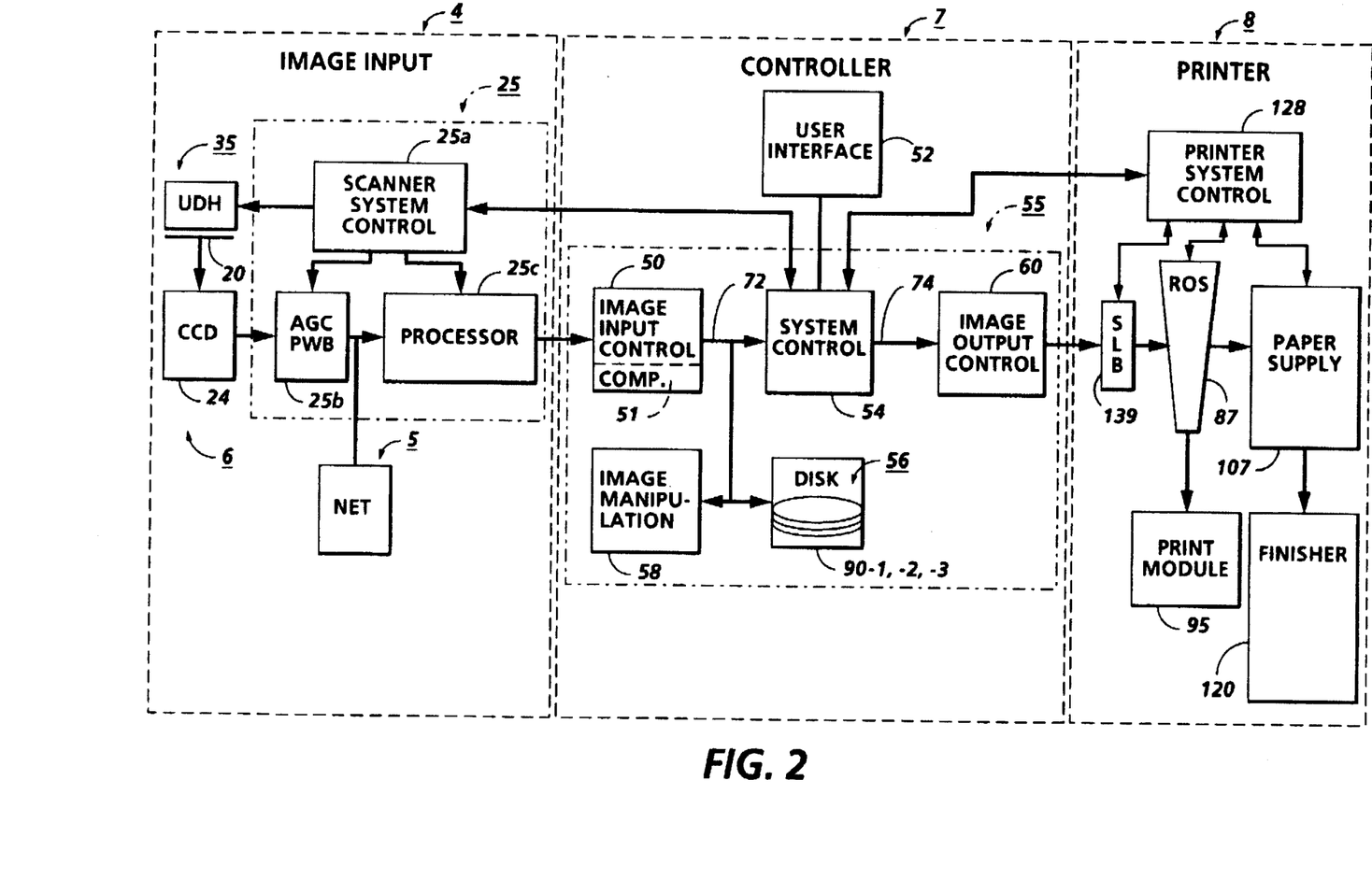
FIG. 2 is a block diagram depicting the major elements of the printer shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer, etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has, in one example, a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

Figure 3:
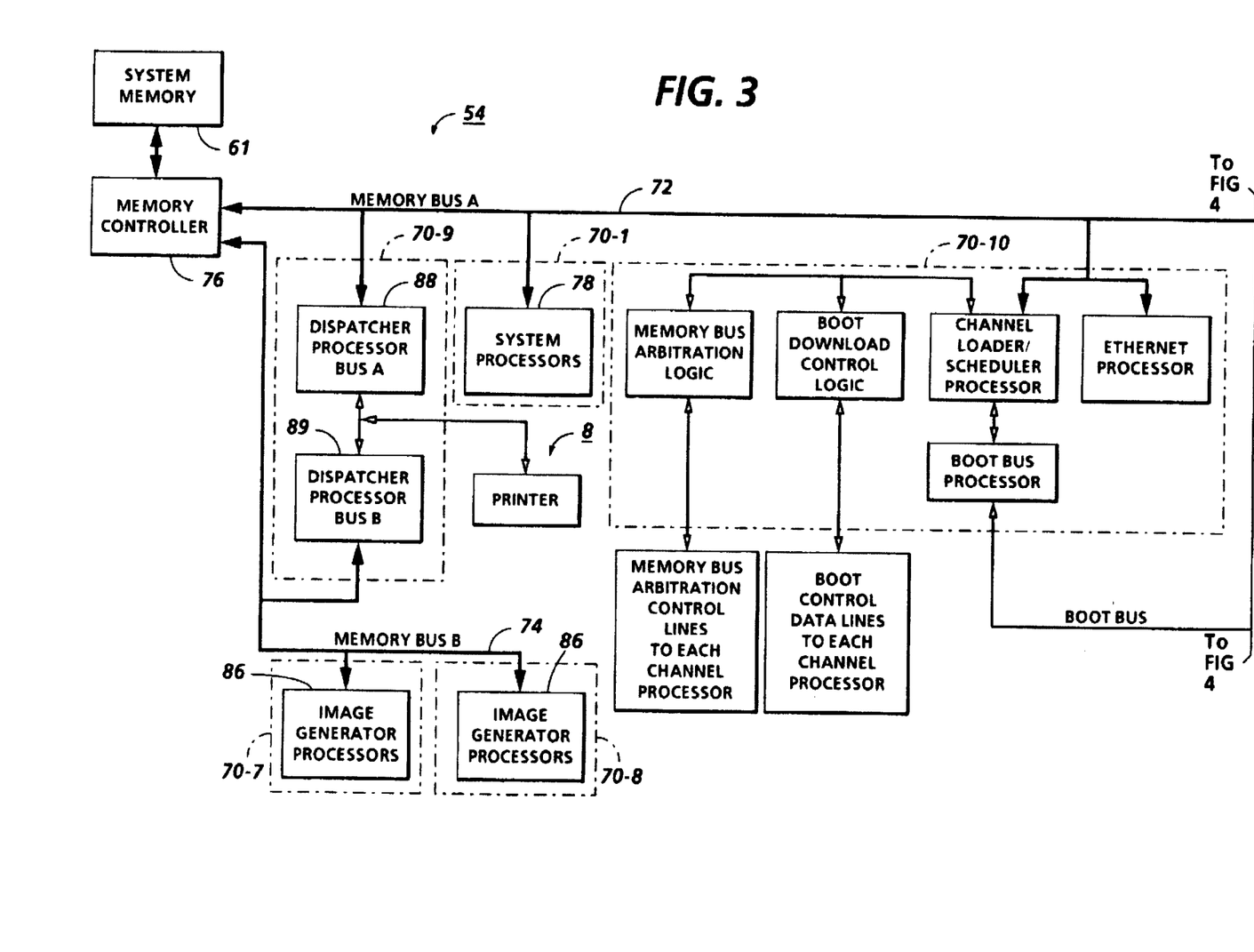
FIGS. 3-5 comprise a schematic block diagram showing the major parts of a controller for the printer shown in FIGS. 1 and 2.

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 4:
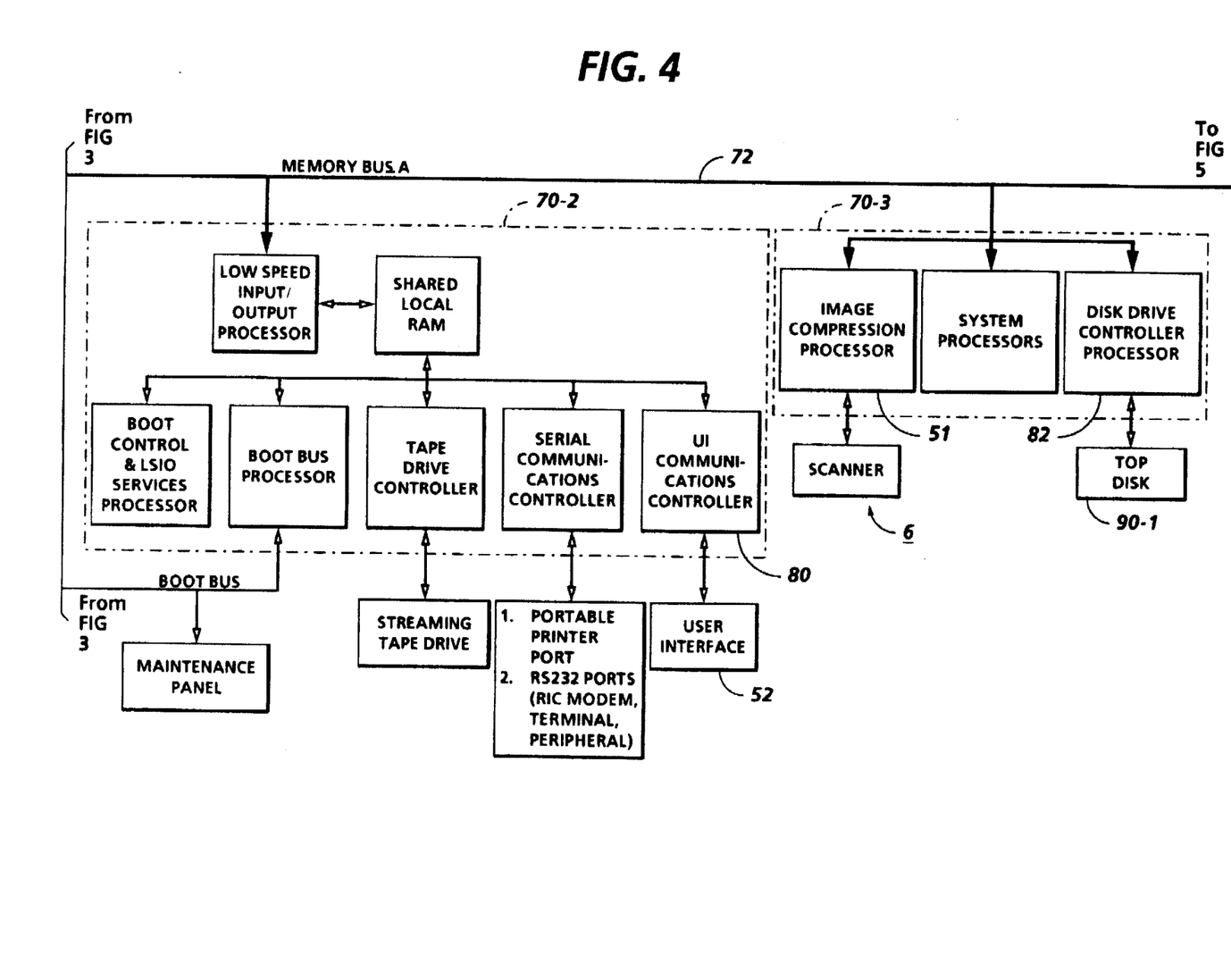
Figure 5:
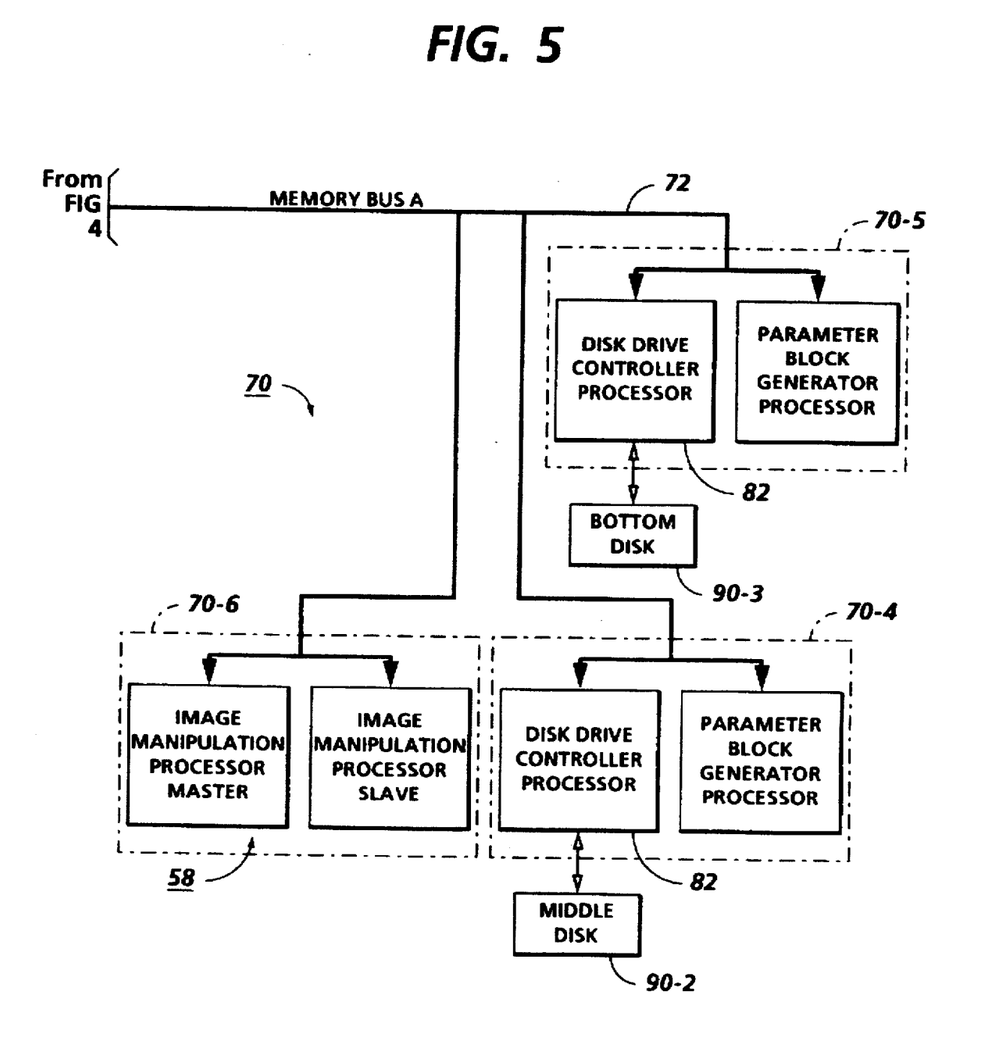

Referring particularly to FIGS. 3-5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3-5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
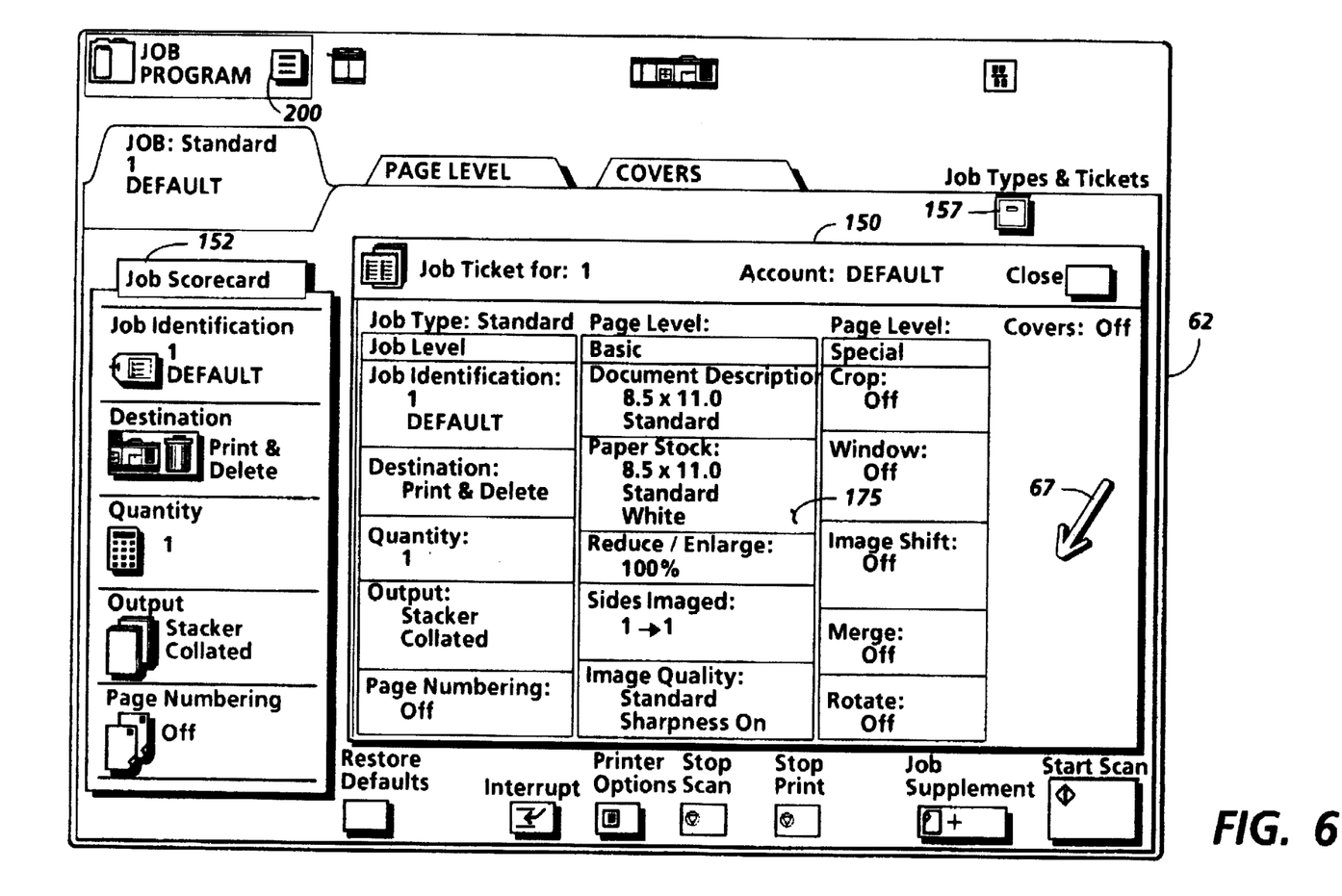
FIG. 6 is a view depicting an exemplary job programming ticket and job scorecard displayed on the User Interface (UI) touchscreen of the printer shown in FIG. 1, the job ticket and job scorecard being associated with a job to be printed.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Figure 7:
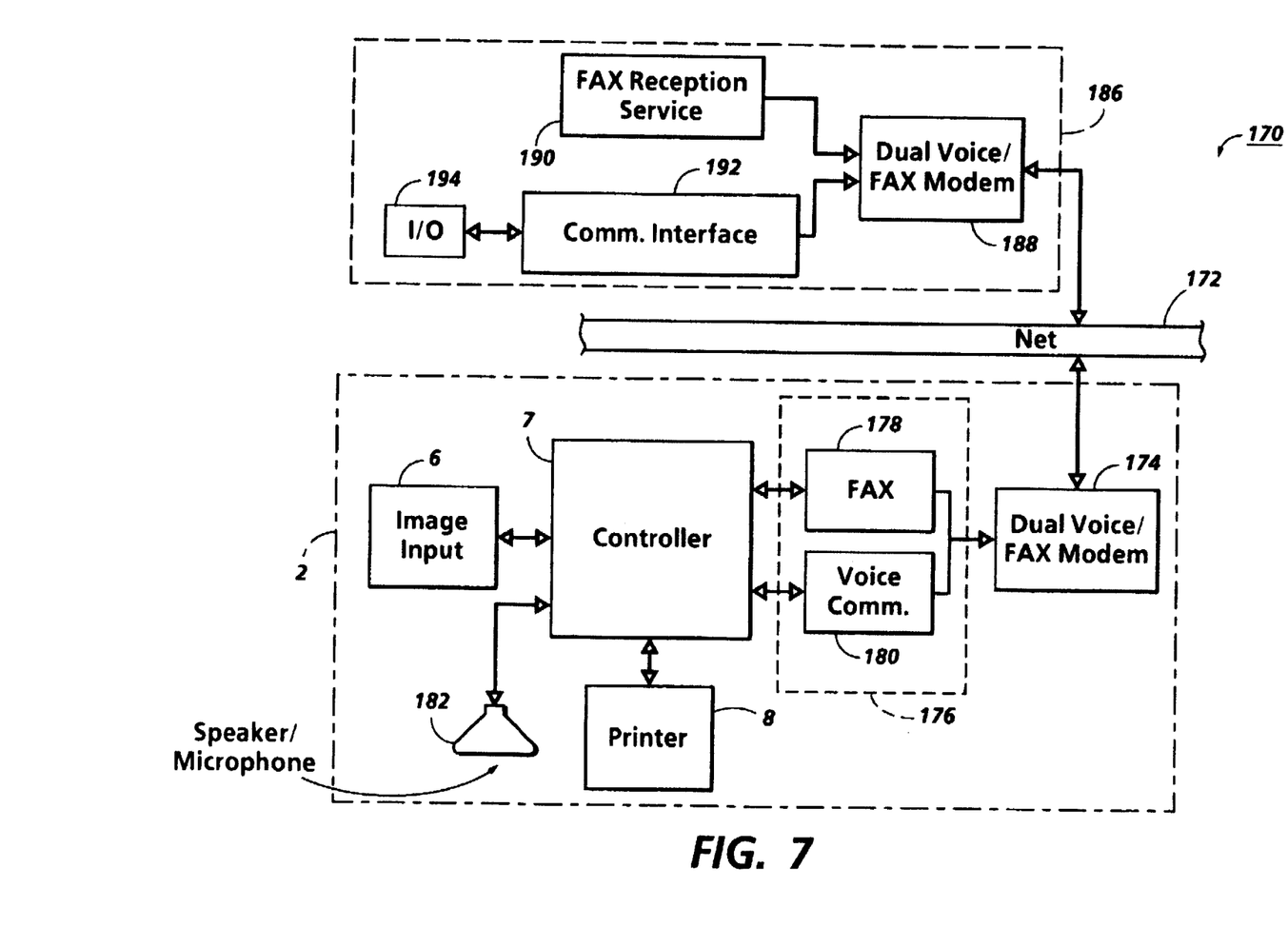
FIG. 7 is a block diagram depicting a network diagnostic system including the printing system of FIG. 2 and a printing machine diagnostic facility (also referred to below as "hotline")

Referring to FIG. 7, a network system for diagnosing a document generated by the printing system 2 is designated with the numeral 170. The network system includes a communications link (e.g. telecommunications line) 172. The printing system 2 is coupled with the communications link 172 by a suitable interface, such as a usual voice/FAX modem 174. Preferably, the printing system 2 includes a facsimile transmission/reception system 176 communicating with the controller 7. In one example, the facsimile transmission/reception includes a FAX transmission/reception subsystem 178, for transmitting and receiving facsimile documents, and a voice communication interface 180 for interfacing an input/output subsystem, e.g. a telecommunications device, with the dual voice/FAX modem 174.

The input/output device may be implemented by providing the user interface 52 (FIG. 2) with telecommunications capability and a suitable microphone/speaker 182 through which voice input/output may be provided. A system including the structure and functionality called for by the illustrated multifunctional printing system of FIG. 7 can be found in Xerox' Document Centre System 20. Moreover, disclosures to multifunctional systems including facsimile capability may be found U.S. Pat. No. 4,821,107 to Naito et al. and U.S. Pat. No. 4,947,345 to Paradise et al., the pertinent portions of which patents are incorporated herein by reference.

The network system 170 further includes a printing machine diagnostic facility (also to referred herein as "hotline") 186 communicating with the communications link 172 by way of a dual voice/FAX modem 188. The hotline further includes a FAX reception subsystem 190 and an input/output communication interface 192. The FAX reception service preferably includes a facsimile print engine for printing facsimile documents received from the communication network and the input/output communication interface includes the necessary hardware/software for coupling an input/output device 194, e.g. telephone, with the modem 188 and ultimately with the communication link 172. Much of the functionality of the subsystem 190 and interface 192 can be implemented with conventional, publicly available "off-the-shelf" software.

Figure 8:
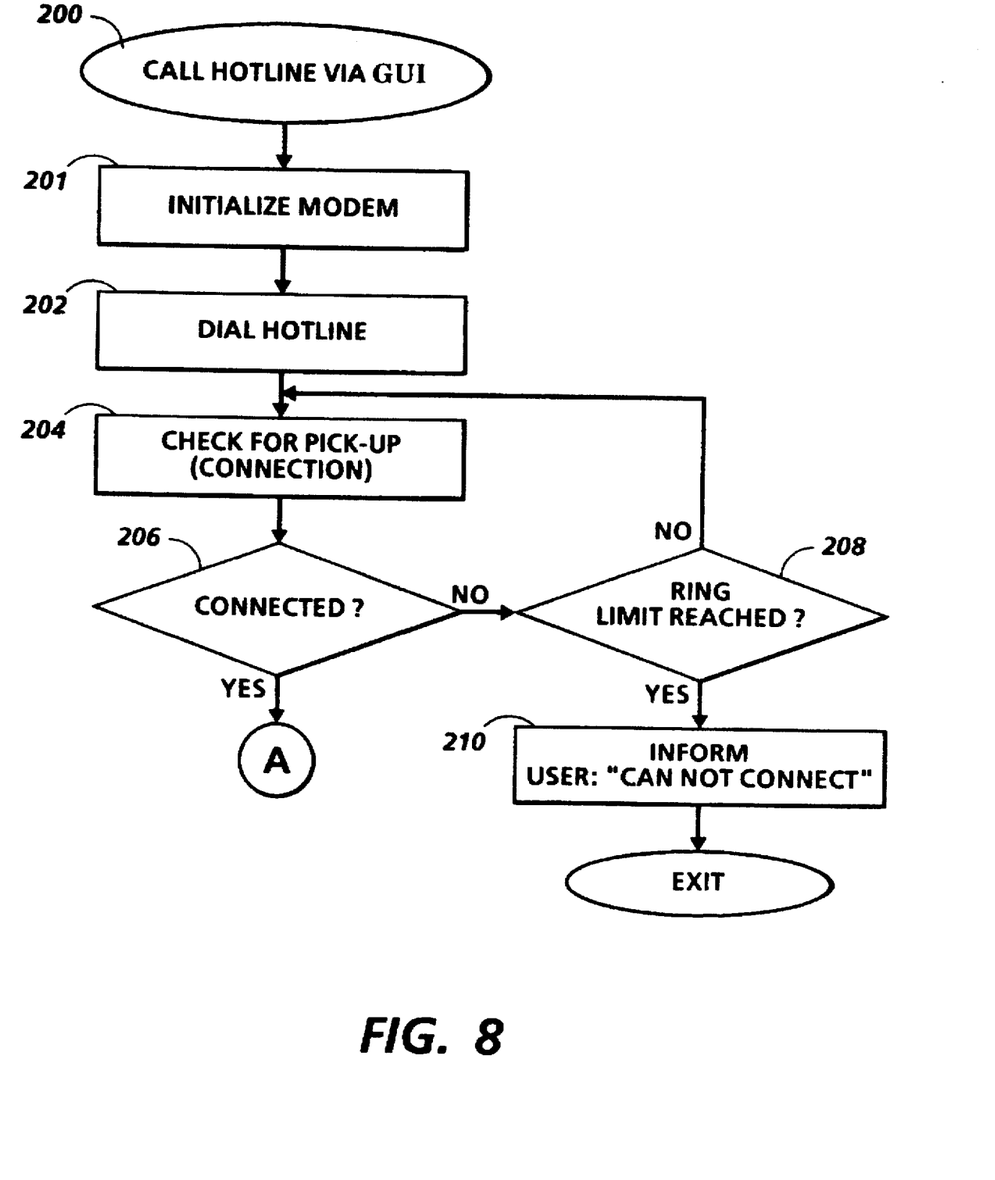
FIGS. 8 is a flow diagram demonstrating a technique for connecting a "Hotline" (remote diagnostic station) with a host printing machine.

Referring to FIGS. 8–12, a technique for diagnosing image data generated at the printing system 2 is shown. Referring first to FIG. 8, a procedure for connecting the printing system 2 with the FAX Service 182 is discussed. At step 200, the operator of the printing machine initiates a call from the printing system (graphic user interface screen 62 (FIGS. 1 and 6) to the above-mentioned comprehensive diagnostic facility (hotline). Pursuant to the call being initiated, the modem 174 (FIG. 7) is, via step 201, initialized. The graphic user interface 62 is used to dial the hotline (step 202) and suitable software is employed to determine if there is a "pick-up" at the hotline (step 204). The software continues to check for a connection (step 206) and if a preset ring limit (step 208) is reached before a connection is made, the printing system operator is informed that a connection is not possible at this time and that s/he should try again later. Provided that a connection is made within the ring limit, the process proceeds to the monitoring process of FIG. 9.

It should be recognized that the connection process could be executed form the hotline end. That is, the hotline could, at a convenient time (possibly at a time when printing system activity is minimal), contactthe printing system and make the necessary connection for transferring images in accordance with the preferred technique. In this way, the printing system operator need not be burdened with even knowing anything about the connecting procedure.

Figure 9:
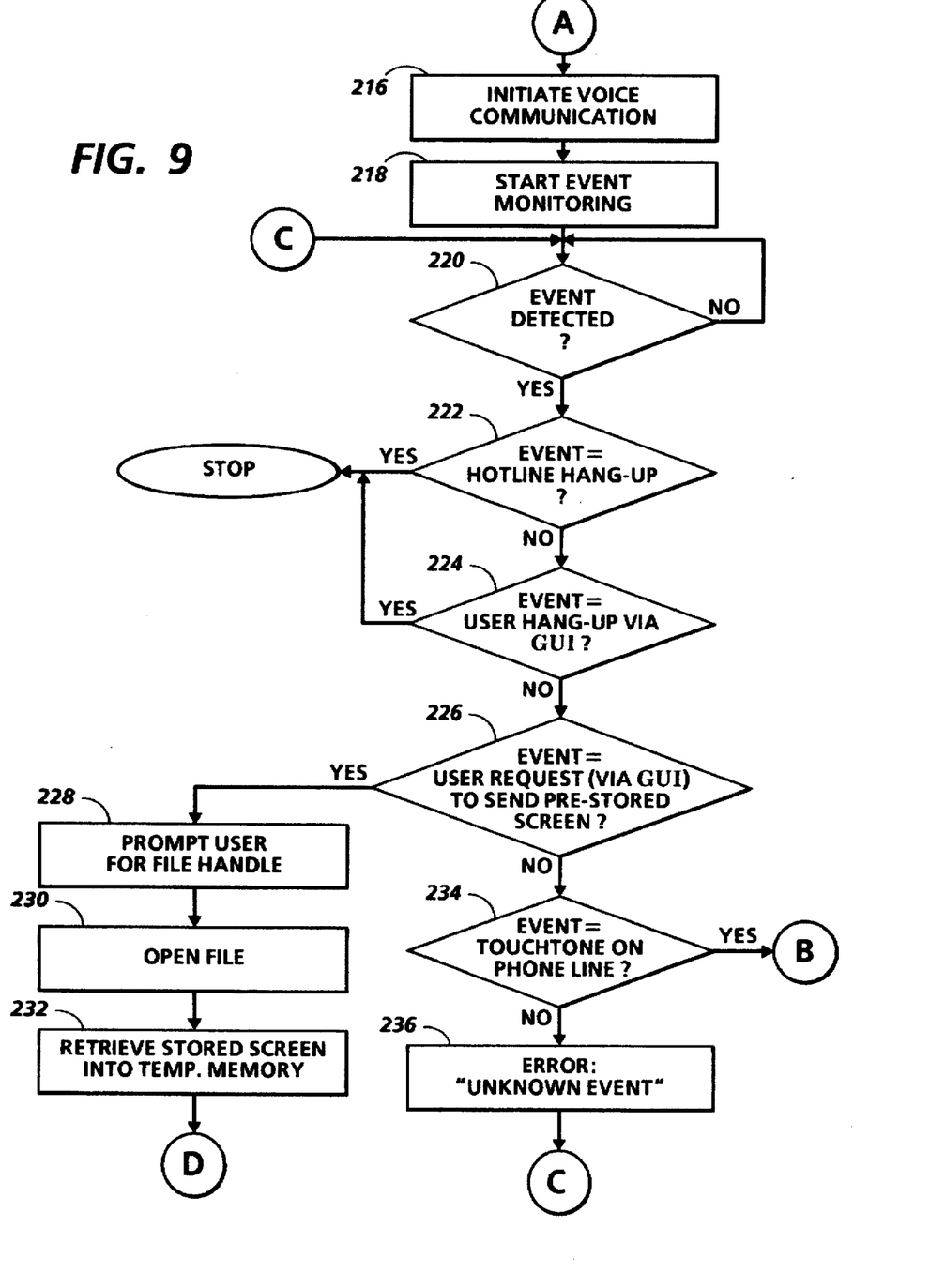
FIG. 9 is a flow diagram depicting a process for use in monitoring a connection between the Hotline and the host printing machine.

In the monitoring process of FIG. 9, voice communication is initiated with one of the CSRs at the hotline (step 216). As will be understood, the embodiment of FIG. 9 only illustrates the monitoring of certain important events and, in practice, other events besides those shown would be monitored. Moreover, in the preferred embodiment, event monitoring is achieved through use of suitable software on the printing system side. At step 218, event monitoring commences and it is determined, at step 220, whether an event occurs. If a hang-up occurs at either the hot-line end or the printing system end (steps 222 and 224), the technique, as a whole, is halted.

Additionally, an event may represent an image retrieval effected cooperatively between the printing system and the hotline. In one example, a plurality of dialog screens are saved for subsequent facsimile transmission to the hotline. This is particularly desirable when a problem at the printing system spans multiple dialog screens. In certain circumstances it may take multiple screens to fully illustrate a complete set of job control information or an image processing problem. Referring specifically to step 226, when the printing system operator (user) is ready to send pre-stored dialog screens, the controller 7 (FIG. 7) prompts the user for a handle (step 228) designating the location at which a file containing the pre-stored dialog screens are located.

Upon obtaining the handle, the file is opened (step 230), by reference to the handle and the dialog screens of the file are, via step 232, stored in temporary memory. In one example, a plurality of dialog screens are printed at reduced size on a single sheet. Multiple dialog screen images can be printed readily on a single sheet since the images associated with dialog screens are invariably lower resolution than, for instance, 8 ½×11 output printed at 300 dpi.

Referring still to FIG. 9, if it is determined, at step 226, that multiple pre-stored dialog screens are not to be retrieved, the process proceeds to step 234 where the monitoring software seeks to detect a touchtone across the communications link 172. If no tone is detected at step 234, then an error message is issued at step 236; otherwise the process proceeds to step 240 (FIG. 10) to determine if a screen copy request has been issued. The screen copy request, in one example, is provided by way of certain telephonic tones, such as the tones associated with "#" and "2". Upon detecting the tone, the printing system causes the dialog screen being displayed to be frozen (step 242).

Pursuant to freezing the screen, the image at the user interface screen 62 (FIGS. 1 and 6) is copied into temporary memory. Once the pixel data corresponding with the image is copied into temporary memory (step 244) the screen image is unfrozen (step 246) so that, if necessary, another image can be copied to temporary memory. For the copied image data, a suitable processor, such as the image manipulation processor 58 (FIGS. 2 and 5) may be used for scaling the image (step 248) to an appropriate size (resolution) for imposition on an electronic FAX page (template) of FIG. 11.

As will be appreciated, scaling, in the context of the preferred embodiment, is particularly advantageous since the resolution of screen images tends to be quite low (e.g. 72 or 120 dpi). It has been found that a desirable facsimile transmissible image is obtained by scaling the dialog screen image from 72 or 120 dpi up to a resolution that is suitable for the facsimile receiver at the hotline (e.g. 300 dpi). As will be further appreciated, the FAX page is preferably stored in mass memory (i.e. on one or more of the disks 90) and copied into system memory (FIG. 3), as required, for appropriate application.

Figure 11:
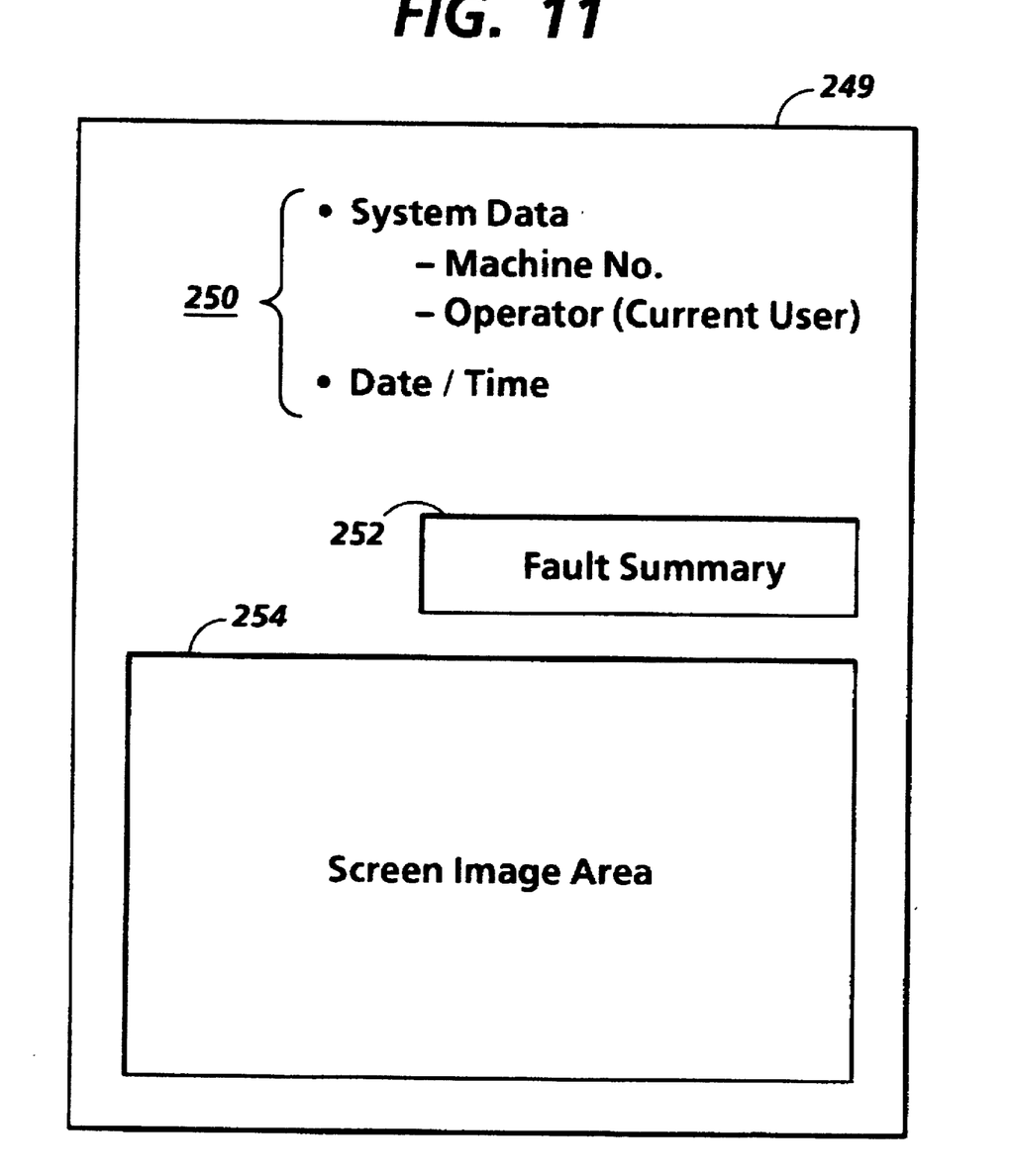
FIG. 11 is an elevational view depicting the formatted FAX page referred to in FIG. 10.

Referring specifically to FIG. 11, the FAX page, designated with the numeral 249 (FIG. 11), includes three major sections 250, 252 and 254. The section 250 is configured to contain system or other data while section 252 is configured to contain fault summary or description of the type shown in U.S. Pat. No. 5,325,156. As will appear, the screen image area on the FAX page of FIG. 11 is configured to be a larger than the dialog screen image by a preset factor.

Figure 10:
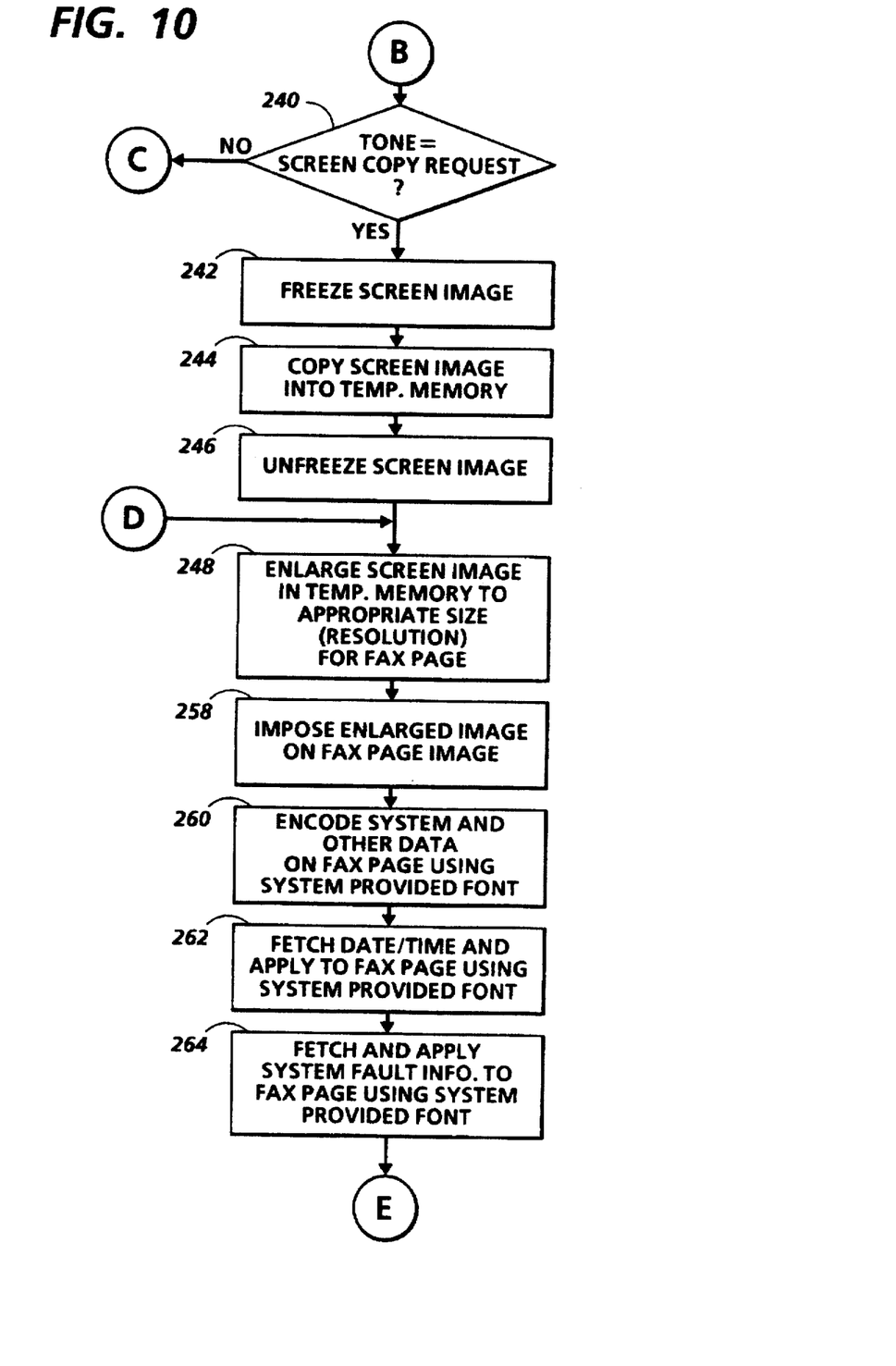
FIG. 10 is a flow diagram depicting a manner in which electronic data is imposed on a formatted FAX page for transmission to the Hotline.

Referring to both FIGS. 10 and 11, at step 258, the scaled image is imposed on the FAX page 249 in section 254. Along with imposing the scaled image into section 254, system data, such as Machine No. and Operator (Current User), is obtained (step 260) and encoded for placement in section 250. Additionally, at step 262, date/time data is fetched from system memory 61 (FIG. 2) for application to the FAX page 249. Finally, system fault information is fetched from memory (step 264) and inserted into section 252. It should be recognized that a dialog screen containing fault information could, alternatively, be inserted into section 254 rather than section 252. Referring again to each of steps 260, 262 and 264, preferably the information is applied to the FAX page through use of a system provided font.

Figure 12:
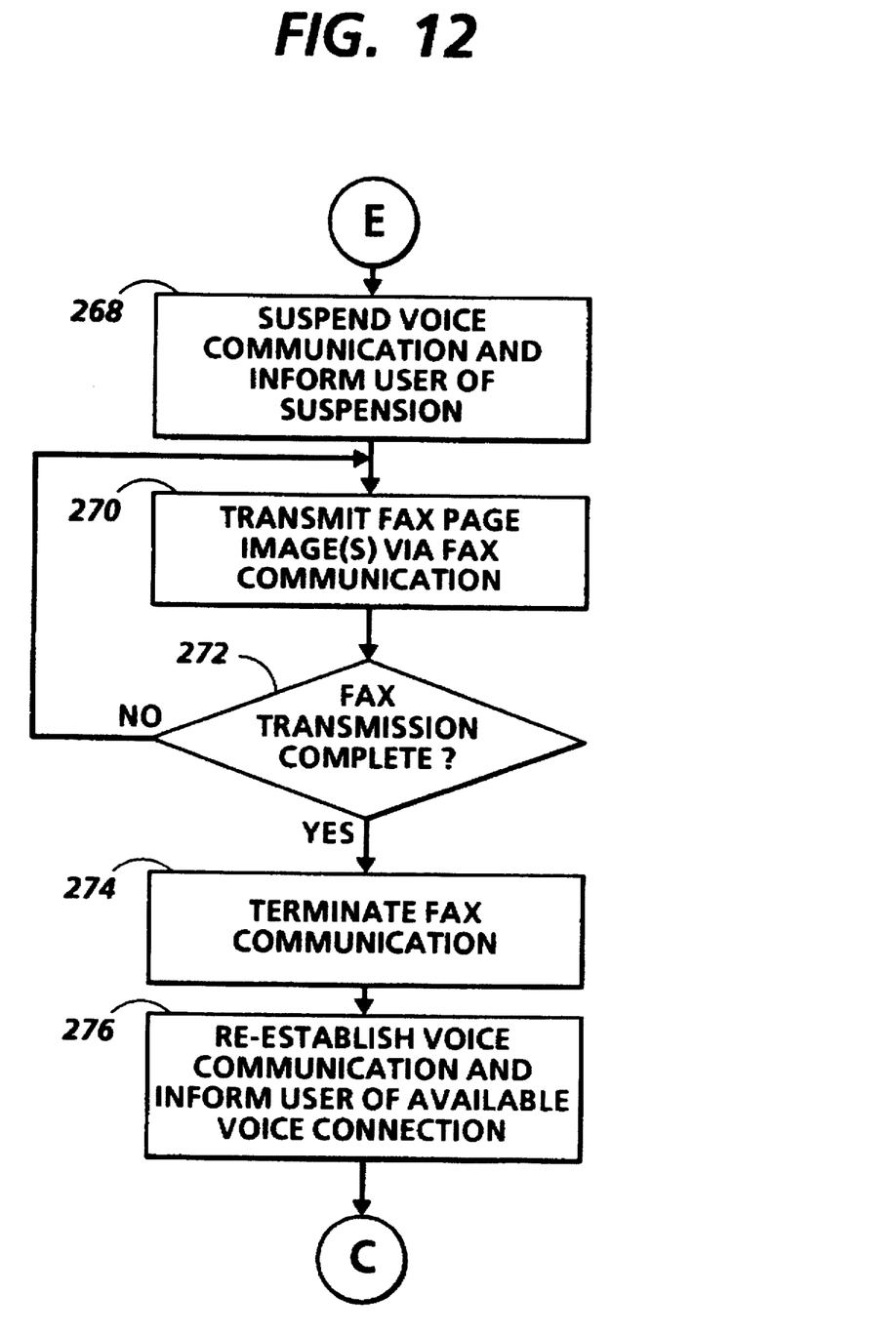
FIG. 12 is a flow diagram depicting a manner for facsimile transmitting an electronic version of the formatted FAX page from the host printing machine to the hotline.

Referring to FIG. 12, at step 268, voice communication between the machine operator and the CSR is suspended so that the one or more pages from temporary memory, with their attendant information, can be facsimile transmitted (step 270) from the subject printing machine (printing system 2 of FIG. 7) to the printing machine diagnostic facility 186. In another contemplated embodiment, a system, made available by A.T.&T. Corporation, could be employed to permit voice communication while a buffered FAX page (s) is being facsimile transmitted. Once facsimile transmission is complete (step 272), the facsimile connection between the remote diagnostic station and the host printing machine is terminated (step 274) so that the subject printing machine operator and CSR can confer (step 276) about the problem at the subject printing machine by common reference to one or more dialog screen images.

It will be understood that a variety of diagnostic operations can be performed by reference to a print including the information of formatted FAX page 249 (FIG. 11). In one example, the formatted page includes an image with an undesirable artifact and the CSR determines an image processing adjustment to be performed at the printing system 2. Such adjustment may include an adjustment to image segmentation of the type discussed in U.S. Pat. No. 5,339,172 to Robinson.

It will be further understood that the term "diagnosis" is used by the present disclosure to encompass a variety of meanings. For instance, as used herein a "diagnostic operation" may include nothing more than guiding a current printing system operator through a confusing routine. That is, the CSR may, in one example, view a dialog screen representation, and indicate to the current printing system operator a course of action to be taken for advancing through a desired printing system routine. Hence, while a diagnostic operation will, in one instance, include some sort of analysis on the part of the CSR, such operation may not require the implementation of a diagnostic routine at the printing system.

Numerous features of the above-described embodiment(s) will be appreciated by those skilled in the art. First, the above-described embodiment(s) discloses a system that permits a dialog screen to be provided, via facsimile transmission, from a subject printing machine operator to a CSR. In turn, the CSR can confer with the subject printing machine operator in a meaningful manner about one or more problems that may be present at the subject printing machine. In one example, a screen including fault information is transmitted from the subject printing machine to the CSR to facilitate diagnostics. This approach to transmitting fault information can be particularly advantageous in machines without RIC or in circumstances where the problem is 1) operation related or 2) represented as a noticeable image quality defect. Moreover, under many circumstances, a cost saving will be incurred by the printing system operator because unwarranted CSE visits will be kept to a minimum.

Second, the image associated with the dialog screen is provided to the hotline in a format that enhances the readability and use of the dialog screen image. In particular, prior to facsimile transmitting the dialog screen image, may be scaled. As a result of the scaling, certain image processing related difficulties may be easier to diagnose. For instance, an artifact that is obscure at 72 dpi may be readily visible at 300 dpi.

Finally, multiple dialog screen images can be facsimile transmitted form the host printing machine to the CSR at one time. In one example, since the dialog screen image are usually small relative to a typical electronic page, multiple dialog screen images can be transmitted on a single page. This sort of multiple image transmission facilitates the diagnosis of complex problems which may manifest themselves over more than one dialog screen.

What is claimed is:

1. A print diagnostic system for performing a diagnostic operation with a print produced from electronic data representative of one or more dialog screens, comprising:
    a) a printing system including,
        (1) a printing machine,
        (2) memory for storing the electronic data, and
        (3) a facsimile transmission system,
    b) a telecommunication link;
    c) a printing machine diagnostic facility communicating with said printing machine by way of said telecommunication link, said print machine diagnostic facility including a facsimile receiving system, said facsimile receiving system including a facsimile print engine for reproducing the print from the electronic data,
    d) a subsystem for specifying one of the one or more dialog screens stored in the printing machine memory for transmission, by way of said telecommunication link, from the printing machine to the printing machine diagnostic facility; and
    e) wherein,
        (1) the electronic data corresponding with the one of the one or more dialog screens is transmitted from the facsimile transmission system to the facsimile receiving system, and
        (2) a print, intended for use in diagnosing printing machine operation, is produced, with the facsimile print engine, by reference to the transmitted electronic data.

2. The print diagnostic system of claim 1, further comprising a user interface with a screen display, said user interface including said specifying subsystem of d).

3. The print diagnostic system of claim 1, in which a plurality of dialog screens, corresponding with electronic data, are stored in said memory, wherein the electronic data corresponding with the plurality of the dialog screens stored in memory is transmitted from said facsimile transmission system to said facsimile receiving system.

4. The print diagnostic system of claim 3, in which the print is defined by multiple portions, wherein the electronic data of a first one of the dialog screens is printed in one of the multiple portions and a representation corresponding with the electronic data of a second one of the dialog screens is printed in another one of the multiple portions.

5. The print diagnostic system of claim 1, in which the print includes multiple portions, the electronic data is formatted, prior to transmitting the same from said facsimile transmission system to said facsimile receiving system, so that a representative portion of the electronic data optimally fits in one of the multiple portions.

6. The print diagnostic system of claim 5, in which the representative portion of the electronic data corresponds with an image, wherein an image processing operation is performed on the image to obtain the formatting.

7. The print diagnostic system of claim 6, in which data corresponding to information about the image is stored in the printing machine memory, wherein a copy of the data corresponding to the information is printed in one of the portions.

8. In a print diagnostic system including a printing machine with a memory for storing electronic data, the printing machine communicating with a printing machine diagnostic facility by way of a telecommunication link, the print machine including a facsimile transmission system and the print machine diagnostic facility including a facsimile receiving system, the facsimile receiving system including a facsimile print engine for reproducing a print from electronic data, a method of performing a diagnostic operation relative to the printing machine by reference to one or more dialog screens, each dialog screen being represented by electronic data and stored in the printing machine memory, comprising:
    a) specifying one of the one or more dialog screens stored in the printing machine memory for transmission, by way of the telecommunication link, from the printing machine to the printing machine diagnostic facility;

b) creating a telecommunication link, across the telecommunication connection, between the facsimile transmission system and the facsimile receiving system to permit communication between the printing machine and the printing machine diagnostic facility;

c) monitoring the telecommunication link to detect an occurrence of an event at either the printing machine or the printing machine diagnostic facility;

d) in response to said detecting of said c) and while maintaining the telecommunication link,
  (1) transmitting the electronic data corresponding with the one of the one or more dialog screens from the facsimile transmission system to the facsimile receiving system, and
  (2) producing a print with the transmitted electronic data, at the facsimile print engine, for performing a diagnostic operation.

9. The method of claim 8, in which the printing machine includes a user interface with a screen display, further including:

e) displaying the one of the one or more dialog screens on the screen display; and f) capturing the electronic data corresponding with the one of the one or more dialog screens, for storage in the printing machine memory, prior to execution of said b).

10. The method of claim 8, in which a plurality of dialog screens, corresponding with electronic data, are stored in the printing machine memory, wherein said d) includes transmitting the electronic data corresponding with the plurality of the dialog screens stored in memory from the facsimile transmission system to the facsimile receiving system for use in producing the print.

11. The method of claim 10, in which the print is defined by multiple portions, wherein said d) (2) includes printing a representation corresponding with the electronic data of a first one of the dialog screens in one of the multiple portions and a representation corresponding with the electronic data of a second one of the dialog screens in another of the multiple portions.

12. The method of claim 8, in which the print corresponds with an electronic page including multiple portions, further comprising formatting the electronic data, prior to transmitting the same with said d) (1), so that a representative portion of the electronic data fits in a first one of the multiple portions.

13. The method of claim 12, in which the representative portion of the electronic data corresponds with an image, wherein said formatting includes performing an image processing operation on the image so that the electronic data corresponding with the image fits within the first one of the multiple portions.

14. The method of claim 13, in which data corresponding with information about the printing machine is stored in the printing machine memory, wherein said formatting includes electronically placing an electronic copy of the data corresponding to the information in a second one of the multiple portions.

15. The method of claim 13, further comprising performing an image processing operation on the electronic data corresponding with the image so that a representation of the image optimally fits in the first one of the multiple portions.

16. The method of claim 8, wherein said b) includes creating the telecommunication link under control of the printing machine diagnostic facility so that creating the telecommunication link is transparent to a current operator of the printing machine.

* * * * *